United States Patent
Shimatani et al.

(10) Patent No.: US 10,567,628 B2
(45) Date of Patent: Feb. 18, 2020

(54) IMAGING DEVICE AND CALIBRATION METHOD THEREOF

(71) Applicant: ROHM CO., LTD., Ukyo-ku Kyoto (JP)

(72) Inventors: Atsushi Shimatani, Ukyo-ku Kyoto (JP); Akihito Saito, Ukyo-ku Kyoto (JP); Yoshihiro Sekimoto, Ukyo-ku Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 16/016,961

(22) Filed: Jun. 25, 2018

(65) Prior Publication Data

US 2018/0376068 A1 Dec. 27, 2018

(30) Foreign Application Priority Data

Jun. 27, 2017 (JP) ................................. 2017-125260

(51) Int. Cl.
*H04N 5/225* (2006.01)
*H04N 5/232* (2006.01)
*G06T 7/80* (2017.01)

(52) U.S. Cl.
CPC ............ *H04N 5/2257* (2013.01); *G06T 7/80* (2017.01); *H04N 5/23254* (2013.01); *H04N 5/23258* (2013.01); *H04N 5/23287* (2013.01)

(58) Field of Classification Search
CPC ............ H04N 5/2257; H04N 5/23258; H04N 5/23254; H04N 5/23287; G06T 7/80
See application file for complete search history.

(56) References Cited

U.S. PATENT DOCUMENTS

| 2009/0230293 A1* | 9/2009 | Hogasten | H04N 5/33 250/252.1 |
| 2015/0035991 A1* | 2/2015 | Sachs | H04N 5/23216 348/187 |
| 2016/0112701 A1* | 4/2016 | Chao | H04N 5/23258 348/187 |

FOREIGN PATENT DOCUMENTS

| JP | 2004194157 A | 7/2004 |
| JP | 2008116920 A | 5/2008 |
| JP | 2008288869 A | 11/2008 |
| JP | 2012247544 A | 12/2012 |
| JP | 2013054193 A | 3/2013 |

OTHER PUBLICATIONS

KIPO Notification of Reason for Refusal corresponding to Application No. 10-2018-0071925; dated Nov. 5, 2019.

* cited by examiner

*Primary Examiner* — Daniel M Pasiewicz
(74) *Attorney, Agent, or Firm* — Cantor Colburn LLP

(57) ABSTRACT

A calibration method for an imaging device including a camera module including an imaging element and a lens installed on a path of light incident on the imaging element; a blur detection element configured to detect an amount of blur acting on the imaging device; and a gravity detection element configured to determine a direction of gravity acting on the imaging device. The calibration method includes: detecting a first angle corresponding to a deviation of a direction of a coordinate axis of the blur detection element with respect to the direction of gravity; detecting a second angle corresponding to a deviation of a direction of the camera module with respect to the direction of gravity; and acquiring a parameter for correcting a detection signal of the blur detection element based on the first angle and the second angle.

8 Claims, 12 Drawing Sheets

IMAGING DEVICE AND CALIBRATION METHOD THEREOF

CROSS-REFERENCE TO RELATED APPLICATION

The present application claims priority under 35 U.S.C. § 119 to Japanese Patent Application No. 2017-125260, filed on Jun. 27, 2017, the entire contents of which are incorporated herein by reference.

TECHNICAL FIELD

The present disclosure relates to an imaging device including an angular velocity detection element such as a gyro sensor, and a calibration method thereof.

BACKGROUND

Recently, in camera modules mounted on smartphones or the like, there has been an increasing number of camera modules incorporating a function of controlling the position of an imaging lens with high precision at high speed by detecting the position of the imaging lens and feeding back the position information. In particular, since high-precision hand blur correction is possible by introducing feedback control into optical image stabilization (OIS), it is expected that the number of cameras that adopt OIS, according to the growing demand for capturing distant subjects without blurring in dark places, will continue to increase in the future.

The hand blur in the cameras may be considered as an angular blur (or shake) in three directions of pitch, yaw, and roll. Generally, the pitch refers to a blur in a vertical direction with respect to an optical axis, the yaw refers to a blur in a horizontal direction with respect to the optical axis, and the roll refers to a rotational blur around the optical axis. Each blur amount is detected as an angular velocity signal by a gyro sensor, and is integrated to calculate an angular blur amount. In the cameras having the OIS function described above, OIS called a lens shift method or a barrel shift method becomes mainstream. In the OIS, hand blur is corrected by shifting the lens within the XY plane perpendicular to the optical axis depending on the angular blur amount in the pitch direction and the yaw direction. For the blur in the roll direction, so-called electronic hand blur correction which corrects it by signal processing is adopted in many cases.

A drive axis of an actuator, a position detection axis, a pixel direction axis of an imaging element, and the like in the camera module do not necessarily coincide with each other with respect to an angular velocity detection axis of the gyro sensor due to each mounting variation or the like. Therefore, certain signal correction (calibration) may be performed. In the case where the gyro sensor is mounted in a substrate of the camera module, a direction of the angular velocity detection axis may be detected by integral vibration, and a position detection signal may be corrected according to the direction of the angular velocity detection axis or an angular velocity detection signal may be corrected according to a drive direction of the actuator.

A technique of correcting an inclination between a shaking detection axis of an angular velocity sensor (gyro sensor) and a shaking correction axis of a drive system (actuator) is disclosed as the related art. Specifically, it is described that a correction signal of an angular velocity signal is obtained by using an inclination θ between the shaking detection axis and the shaking correction axis. As methods of obtaining the inclination θ, a method of measuring a mechanical angle and a method of actually giving an angular velocity (i.e., vibrating) are disclosed.

Similarly, a technique of correcting an output error based on the inclination of the installation angle of the angular velocity sensor is disclosed as the related art. Specifically, it is disclosed that an output error based on the inclination of the installation angle of the angular velocity sensor is corrected, and a correction factor is obtained from a ratio of outputs of the angular velocity sensor in two directions when vibration is applied in a predetermined axial direction.

Meanwhile, an example of a camera equipped with an acceleration sensor in addition to the angular velocity sensor in order to correct even a translation blur as well as the angular blur is disclosed as the related art. Specifically, it is disclosed that the angular velocity sensor and the acceleration sensor are mounted, and the translation blur is corrected together with the angle blur and a calculation amount of the translation blur is changed according to a posture of the camera.

However, it is very difficult to mechanically measure a direction of a detection axis within a packaged angular velocity sensor, and it is also time-consuming and cumbersome to apply vibration to the camera modules one by one during the manufacturing process of the camera modules.

Further, when the camera module and the angular velocity sensor are integrated, it may be possible to adopt a method of performing calibration by the integral vibration as described above, but when the camera module and the angular velocity sensor are separately mounted and then individually verified, calibration may be performed by establishing a certain criteria in each of the camera module and the angular velocity sensor, for example, when the maker that inspects the camera module is different from the maker that mounts the angular velocity sensor, or the like. However, such calibration is impossible using the integral vibration in the related art.

SUMMARY

Some embodiments of the present disclosure provide a method of calibrating an imaging device without an application of vibration. Further, some embodiments of the present disclosure provide an imaging device capable of high-precision hand blur correction.

According to an aspect of the present disclosure, a calibration method for an imaging device is provided. The imaging device to be calibrated includes: a camera module including an imaging element and a lens installed on a path of light incident on the imaging element; a blur detection element configured to detect an amount of blur acting on the imaging device; and a gravity detection element configured to determine a direction of gravity acting on the imaging device. The calibration method includes: detecting a first angle corresponding to a deviation of a direction of a coordinate axis of the blur detection element with respect to the direction of gravity; detecting a second angle corresponding to a deviation of a direction of the camera module with respect to the direction of gravity; and acquiring a parameter for correcting a detection signal of the blur detection element based on the first angle and the second angle.

According to this method, it is possible to detect a deviation angle of the coordinate axis of the blur detection element with respect to the direction of gravity without application of vibration, and to detect the direction of the camera module with respect to the direction of gravity, for example, a deviation angle of a direction of a pixel axis. Therefore, even when the camera module and the blur detection element are not integrated, it is possible to perform calibration to correct the blur detection signal according to the direction of the camera module by using the direction of the gravity as an intermediary, thereby realizing high-precision hand blur correction.

In some embodiments, the act of detecting the second angle may include capturing a chart having a predetermined pattern with the imaging element; and acquiring the second angle based on a deviation between a direction of the predetermined pattern and a direction of a pixel axis in a captured image.

According to this method, since a deviation angle between the direction of the predetermined pattern and the direction of the pixel axis is detected in consideration of the deviation between the direction of the predetermined pattern of the chart and the direction of gravity, it is possible to detect the deviation angle between the direction of the pixel axis of the camera module and the direction of gravity.

In some embodiments, the act of detecting the second angle may further include adjusting the direction of the predetermined pattern of the chart in advance according to the direction of gravity.

According to this method, since the direction of the predetermined pattern of the chart matches the direction of gravity, it is possible to detect the deviation angle between the direction of the pixel axis and the direction of gravity by detecting the deviation angle between the direction of the predetermined pattern and the direction of the pixel axis.

In some embodiments, the act of detecting the second angle may further include detecting a third angle corresponding to a deviation between the direction of the predetermined pattern of the chart and the direction of gravity in advance. The third angle may be used for detecting the second angle.

According to this method, even when the direction of the predetermined pattern of the chart deviates from the direction of gravity, it is possible to calculate a deviation angle between the direction of the pixel axis and the direction of gravity by recognizing a deviation angle between the direction of the predetermined pattern of the chart and the direction of gravity.

In some embodiments, the act of detecting the first angle may include detecting a fourth angle corresponding to a deviation between a direction of a coordinate axis of the gravity detection element and the direction of gravity. The direction of the coordinate axis of the blur detection element and the direction of the coordinate axis of the gravity detection element may be set to be substantially parallel to each other, and the fourth angle may be set as the first angle.

According to this method, since the calibration is performed by allowing the direction of the coordinate axis of the blur detection element to substantially coincide with the direction of the coordinate axis of the gravity detection element, it is possible to use the deviation angle between the coordinate axis of the gravity detection element and the direction of gravity instead of the deviation angle between the direction of the coordinate axis of the blur detection element and the direction of gravity.

According to another aspect of the present disclosure, an imaging device is provided. The imaging device includes: a camera module including an imaging element and a lens installed on a path of light incident on the imaging element; a blur detection element configured to detect an amount of blur acting on the imaging device; and a gravity detection element configured to determine a direction of gravity acting on the imaging device, wherein calibration is performed by one of the calibration methods described above.

According to the configuration described above, it is possible to detect the deviation angle of the coordinate axis of the blur detection element with respect to the direction of gravity without application of vibration, and to detect the direction of the camera module with respect to the direction of gravity, for example, a deviation angle of a direction of the pixel axis. Therefore, even when the camera module and the blur detection element are not integrated, it is possible to perform calibration to correct the blur detection signal according to the direction of the camera module by using the direction of the gravity as an intermediary, thereby realizing an imaging device capable of performing a high-precision hand blur correction.

In some embodiments, the blur detection element and the gravity detection element may be integrally packaged. Since the blur detection element and the gravity detection element are integrally packaged, it is possible to reduce a mutual directional deviation between the coordinate axes of the blur detection element and the gravity detection element as small as possible. Thus, it is possible to detect the deviation angle between the direction of the coordinate axis of the blur detection element and the direction of gravity even when vibration is not applied.

In some embodiments, a blur detection part of the blur detection element and a gravity direction detection part of the gravity detection element may be fabricated by the same process. Since the blur detection part of the blur detection element and a gravity direction detection part of the gravity detection element are fabricated with high precision by the same silicon process, it is possible to further reduce a mutual directional deviation between coordinate axes of the blur detection part and the gravity direction detection part. Thus, it is possible to detect the deviation angle between the direction of the coordinate axis of the blur detection element and the direction of gravity even when vibration is not applied.

Further, in some embodiments, the gravity detection element may be an acceleration sensor configured to detect accelerations in at least two axial directions. Since the acceleration sensor is used as the gravity detection element, it can be utilized not only for detecting the direction of gravity but also for correcting a translation blur. Thus, it can be used effectively.

Further, in some embodiments, the camera module may further include: an actuator configured to displace the lens in a direction perpendicular to an optical axis; a position detection element configured to detect a displacement of the lens in the direction perpendicular to the optical axis. Further, a position detection signal of the position detection element may be corrected so as to eliminate an influence of a deviation in a detection direction of the position detection element with respect to a direction of a pixel axis of the imaging element. According to this embodiment, since the deviation of the detection direction of the position detection element with respect to the direction of the pixel axis of the imaging element in the camera module is corrected, calibration between two detection means which are the blur detection element and the position detection element becomes possible.

In addition, any combination of the above-described elements and those obtained by mutual replacement of elements or representations of the present disclosure among methods, apparatuses, systems, and others are effective as modes of the present disclosure.

Further, the description of the embodiments of the present disclosure does not explain all combinations of features and, therefore, subcombinations of the features which are described are included in the present disclosure.

DETAILED DESCRIPTION

Figure 1:
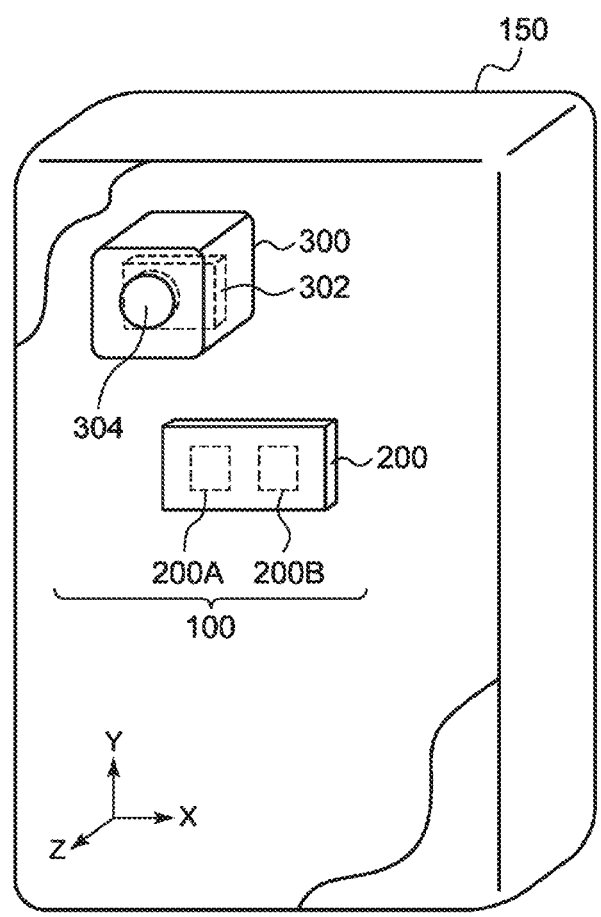
FIG. 1 is a diagram illustrating an imaging device according to an embodiment of the present disclosure.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In addition, the dimensions (thickness, length, width, and the like) of respective members described in the drawings may be scaled up or down appropriately in order to facilitate understanding. Further, it cannot be said that the dimensions of a plurality of members necessarily indicate their magnitude relationship, and although a certain member A is drawn to be thicker than another member B on the drawings, the member A may be thinner than the member B.

In the present disclosure, "a state where a member A is connected to a member B" includes a case where the member A and the member B are physically directly connected or even a case where the member A and the member B are indirectly connected through any other member that does not substantially affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not substantially affect an electrical connection state between the members A and C or the members B and C or does not impair functions and effects achieved by combinations of the members A and C or the members B and C, in addition to a case where the member A and the member C or the member B and the member C are directly connected.

<Calibration for Coordinate Axis>

First, a calibration method according to an embodiment of the present disclosure will be described with reference to FIG. 1 to FIG. 9.

FIG. 1 is a diagram illustrating an imaging device 100 according to an embodiment of the present disclosure. The imaging device 100 is a part of an electronic device 150 having an imaging function, and includes a gravity and blur detection element 200 and a camera module 300. The electronic device 150 is exemplified by, but not limited to, a smartphone, a tablet terminal, a laptop computer, a portable audio player, or the like.

The gravity and blur detection element 200 includes a blur detection element 200A for detecting an amount of blur acting on the imaging device 100, and a gravity detection element 200B for determining a direction of gravity acting on the imaging device. An element such as a gravity sensor may be used as the gravity detection element, since it is sufficient if the direction of gravity can be detected. However, since an acceleration sensor can be used not only to detect the direction of gravity but also to correct a translation blur, the gravity detection element will be described herein as the acceleration sensor. As the blur detection element, it is illustrated that a general gyro sensor is used as a blur detection means.

In the present disclosure, a detection axis of the blur detection element 200A is referred to as an angular velocity detection axis, and a detection axis of the gravity detection element 200B is referred to as an acceleration detection axis.

The gravity and blur detection element 200 in which the acceleration sensor and the gyro sensor are mounted in one package is commercially available, and is mounted with high precision such that a deviation between the acceleration detection axis and the angular velocity detection axis becomes small. Therefore, it may be desirably used. Further, if the acceleration sensor and the gyro sensor are formed by an MEMS technology and fabricated by the same process, it may be expected that a relationship between coordinate axes of the acceleration sensor and the gyro sensor is formed with the accuracy of the silicon process, which is further desirable.

The camera module 300 includes an imaging element 302 and a lens 304. In the present disclosure, a horizontal direction and a vertical direction of the imaging element 302 are generally referred to as a pixel axis. The lens 304 is installed on the path of light incident on the imaging element 302. For the sake of convenience, an X axis is taken in the left and right direction, a Y axis is taken in the vertical direction, and a Z axis is taken in the depth direction, with respect to the electronic device 150.

The lens 304 is supported so as to be displaceable in the optical axis direction (Z axis direction) for auto focusing, and is positioned by an actuator (not shown). Further, in the case of the camera module 300 having a hand blur correction function, the lens 304 is supported so as to be displaceable also in the X direction and the Y direction, and is configured to be positioned with respect to each of the X direction and the Y direction by the actuator (not shown).

Ideally, it is desirable that the pixel axis of the camera module 300 match the X axis and the Y axis of the electronic device 150 and the two detection axes of the gravity and blur detection element 200 also match the X axis and the Y axis of the electronic device 150. However, due to a problem in assembly accuracy, it is difficult to make them perfectly match the X axis and the Y axis.

Therefore, in the calibration method according to the present embodiment, a deviation between the direction of the angular velocity detection axis of the blur detection element 200A and the direction of the pixel axis of the camera module 300 is detected by using the direction of the gravity as an intermediary, and the deviation is corrected. In the present embodiment, when a "detection axis" is simply used, it indicates a detection axis that should be parallel to the Y axis.

Figure 2:
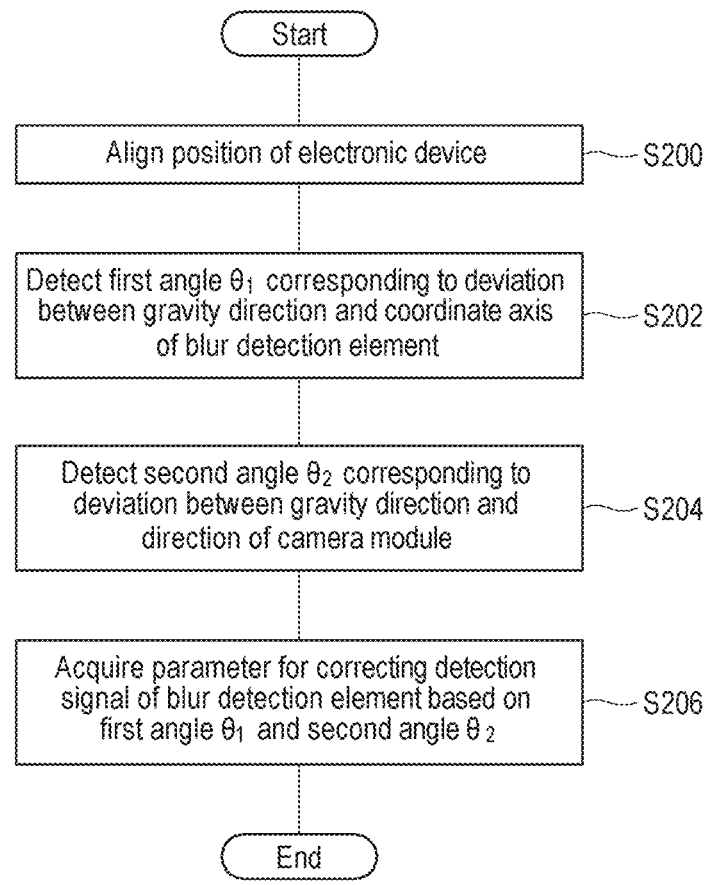
FIG. 2 is a flowchart of calibration according to an embodiment of the present disclosure.

The calibration is executed after the camera module 300 and the gravity and blur detection element 200 are mounted on the electronic device 150. FIG. 2 is a flowchart of the calibration according to an embodiment of the present disclosure.

First, a position of the electronic device 150 is aligned such that the Y axis of the electronic device 150 is parallel to the direction of gravity (i.e., the vertical direction) (S200). Further, as will be described below, since an inclination of the electronic device 150 does not substantially affect the calibration, step S200 may be omitted.

Then, a first angle $\theta_1$ corresponding to a deviation of the direction of the coordinate axis of the blur detection element 200A with respect to the direction of gravity is detected (S202). Further, a second angle $\theta_2$ corresponding to a deviation of the direction (pixel axis) of the camera module 300 with respect to the direction of gravity is detected (S204).

Figure 3:
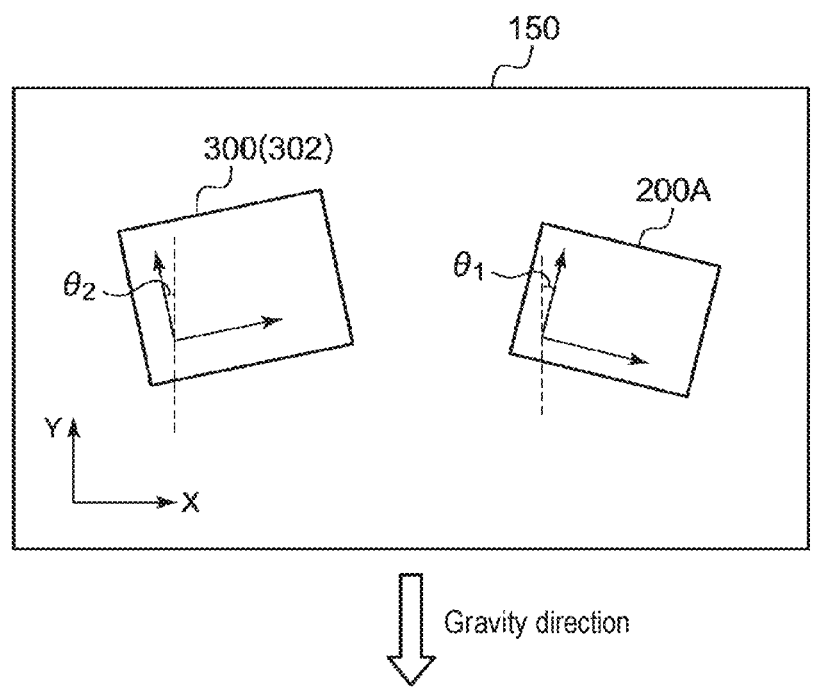
FIG. 3 is a diagram illustrating a first angle $\theta_1$ and a second angle $\theta_2$ measured in the calibration of FIG. 2.

FIG. 3 is a diagram illustrating the first angle $\theta_1$ and the second angle $\theta_2$ measured in the calibration of FIG. 2. In steps S202 and S204, these angles $\theta_1$ and $\theta_2$ are measured.

Returning to FIG. 2, a parameter for correcting the detection signal of the blur detection element 200A is acquired based on the measured first angle $\theta_1$ and second angle $\theta_2$ during the actual operation of the electronic device 150 (S206). A value calculated by using $\theta_1$ and $\theta_2$ may be used as the parameter or $\theta_1$ and $\theta_2$ may be used as the parameter.

The basic principle of the calibration method according to an embodiment of the present disclosure has been described above. Hereinafter, an example of the calibration will be described.

Figure 4A:
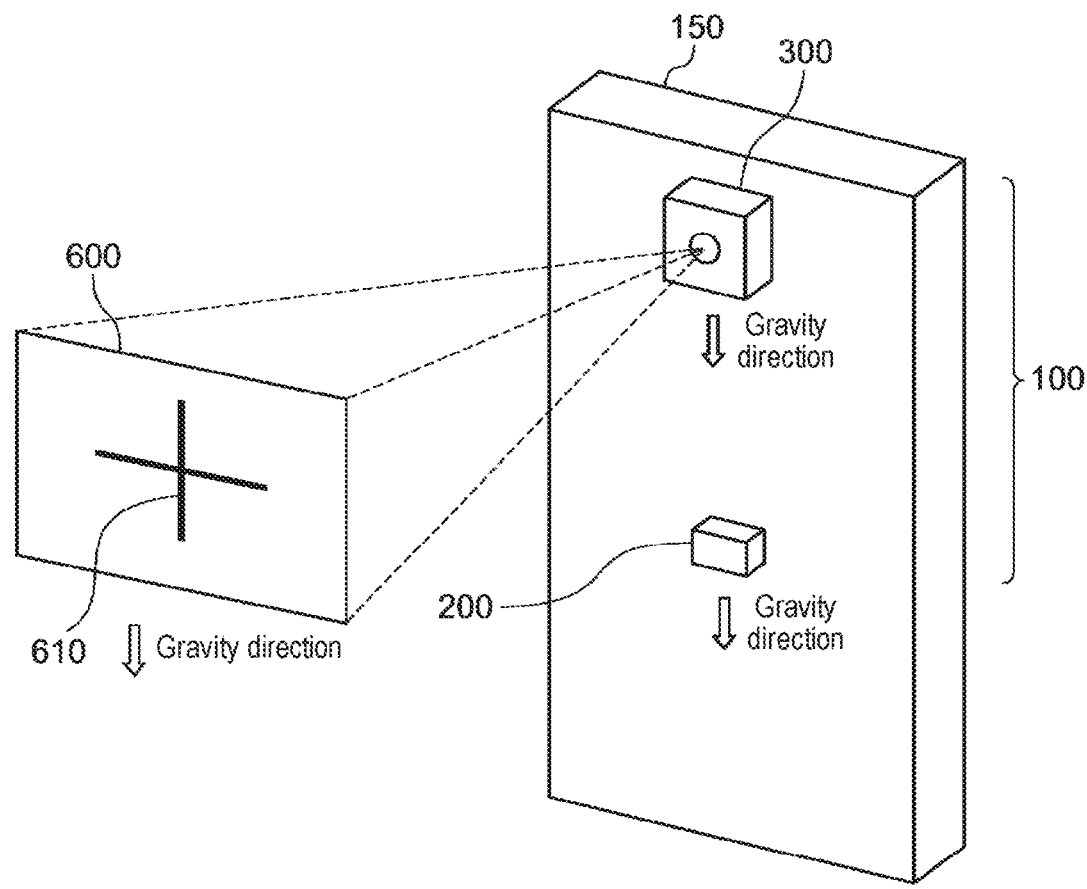
FIG. 4A and FIG. 4B are diagrams illustrating the calibration according to an embodiment of the present disclosure.
Figure 4B:
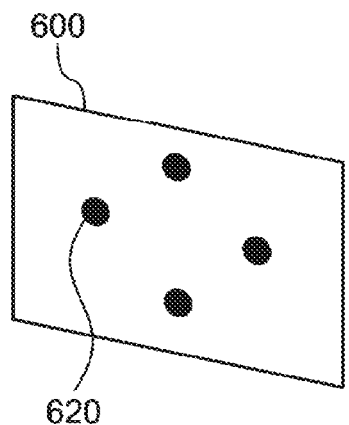

FIG. 4A and FIG. 4B are diagrams illustrating calibration according to an embodiment of the present disclosure. FIG. 4A illustrates a setup in a calibration process. FIG. 4B illustrates an exemplary modification of a chart 600 that can be used for calibration.

When the calibration is executed, the chart 600 is used. In the chart 600, for example, a cross-shaped linear pattern 610 is formed. However, the pattern is not limited thereto but may be a dot pattern 620 of about 4 points as illustrated in FIG. 4B. The camera module 300 may capture the linear pattern 610 of the chart 600 and acquire it as an image. A chart obtained by displaying a certain pattern on a high-definition display panel may be used as the chart 600.

Figure 5A:
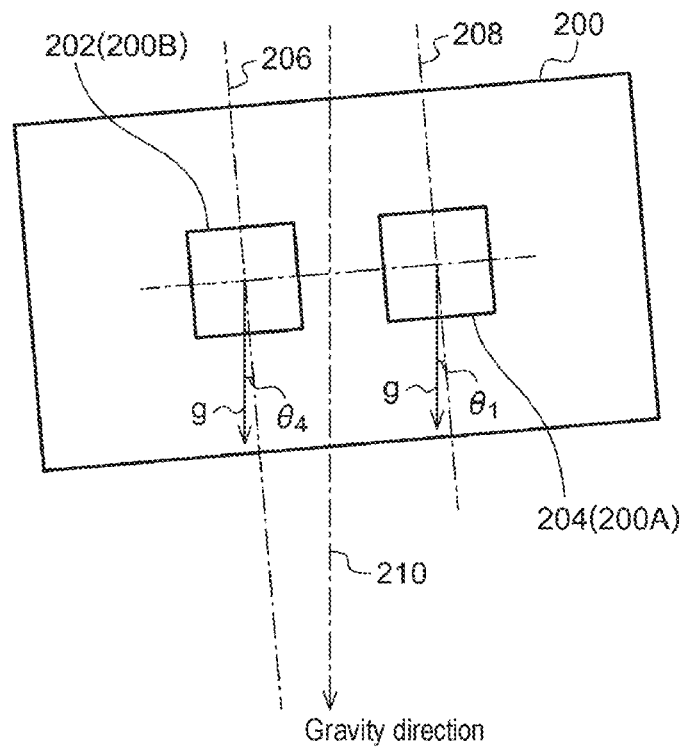
FIG. 5A and FIG. 5B are views illustrating a state in which a gravity and blur detection element is inclined with respect to the direction of gravity.
Figure 5B:
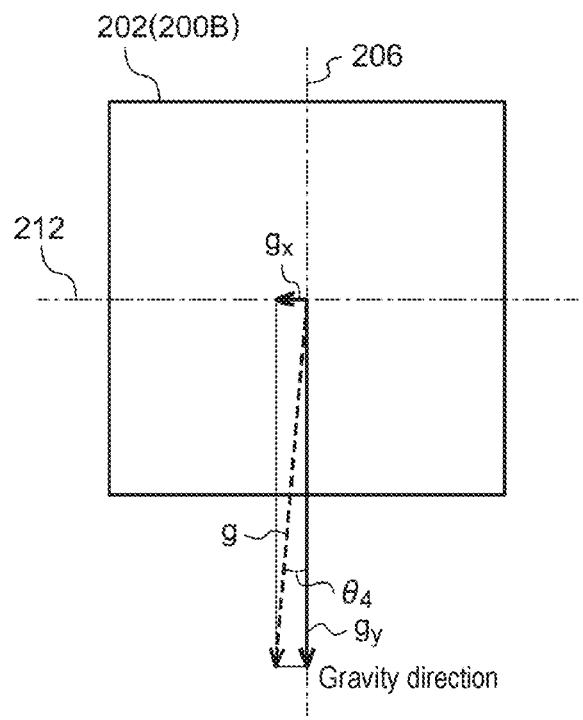

An inclination (i.e., the first angle $\theta_1$) of the gravity and blur detection element 200 with respect to the direction of gravity will be described with reference to FIG. 5A and FIG. 5B. FIG. 5A and FIG. 5B are views illustrating a state in which the gravity and blur detection element is inclined with respect to the direction of gravity. FIG. 5A illustrates an overall view, and FIG. 5B illustrates an enlarged view of an acceleration detection part.

The gravity and blur detection element 200 includes an acceleration detection part 202 (the gravity detection element 200B in FIG. 1) and an angular velocity detection part 204 (the blur detection element 200A in FIG. 1) in the same package. It is illustrated that a coordinate axis 206 of the acceleration detection part 202 and a coordinate axis 208 of the angular velocity detection part 204 are substantially parallel. The gravity and blur detection element 200 is inclined with respect to a direction of gravity 210. The inclination may be considered as being caused by an inclination of axis in the gravity and blur detection element 200, a mounting inclination, an inclination of the entire electronic device 150, or the like. Since the inclination of the entire electronic device 150 is also given to the camera module 300, it is canceled out. When the coordinate axis 206 of the acceleration detection part 202 is inclined with respect to the direction of gravity 210, as illustrated in FIG. 5B, a gravity acceleration g is vector-decomposed in two axial directions, in which $g_y$ is detected as the gravity acceleration on the same side with the coordinate axis 206 and $g_x$, which is perpendicular to $g_y$, is detected as the gravity acceleration on the same side as the coordinate axis 212. Therefore, an inclination angle (fourth angle) $\theta_4$ is obtained as follows.

$$\theta_4 = \tan^{-1}(g_x/g_y) \qquad \text{Eq.(1)}$$

When the coordinate axis 206 of the acceleration detection part 202 and the coordinate axis 208 of the angular velocity detection part 204 are substantially parallel, the fourth angle $\theta_4$ obtained by Eq. (1) is equal to an angle corresponding to a deviation of the coordinate axis 208 of the angular velocity detection part 204 with respect to the direction of gravity, namely the first angle $\theta_1$ corresponding to the deviation between the direction of the coordinate axis of the blur detection element 200A in FIG. 3 and the direction of gravity.

Figure 6A:
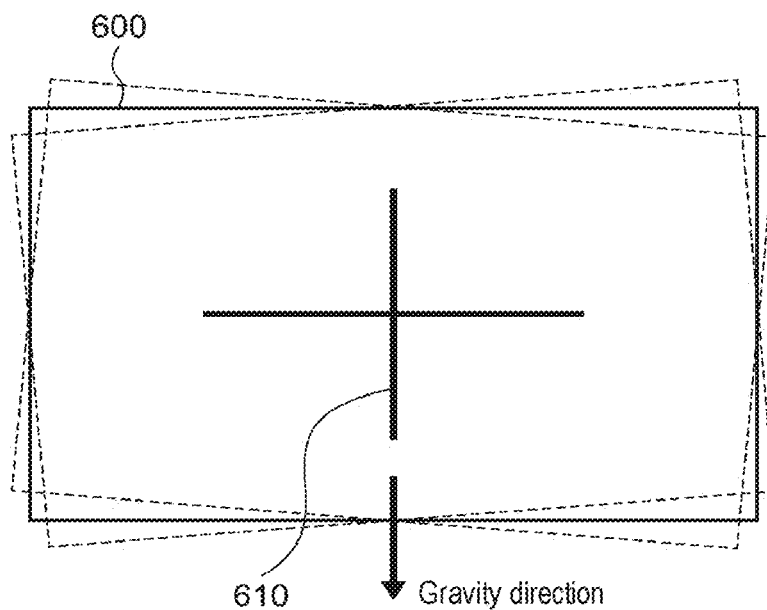
FIG. 6A and FIG. 6B are diagrams illustrating a state in which a chart is inclined with respect to the direction of gravity.
Figure 6B:
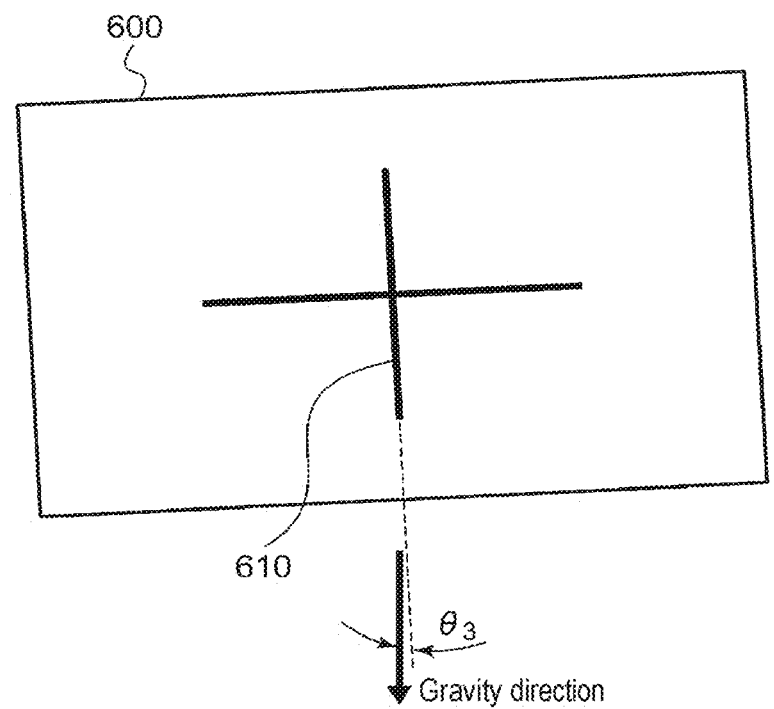

Next, the adjustment of the chart 600 will be described with reference to FIG. 6A and FIG. 6B. FIG. 6A and FIG. 6B are diagrams illustrating a state in which the chart is inclined with respect to the direction of gravity. The direction of the pattern 610 in the chart 600 may be inclined with respect to the direction of gravity (vertical direction). In that case, as illustrated in FIG. 6A, the entire chart 600 is rotated and adjusted such that the direction of the pattern 610 matches the direction of gravity. The direction of gravity may be determined based on a direction of a piece of yarn hanging a weight, or the like. A level may be set and adjusted in a direction of a horizontal line of the pattern 610. Since the adjustment of the chart may be performed only once at the time of setting the device, the adjustment may be performed even if it takes time. However, if the chart cannot be adjusted, a deviation angle (a third angle $\theta_3$) between the direction of the pattern 610 and the direction of gravity may be measured and corrected at the time of calculating the deviation angle of the camera module, as illustrated in FIG. 6B. In the present embodiment, it is assumed that there is no deviation ($\theta_3=0$) between the direction of the pattern 610 and the direction of gravity as a result of strict position alignment.

Figure 7:
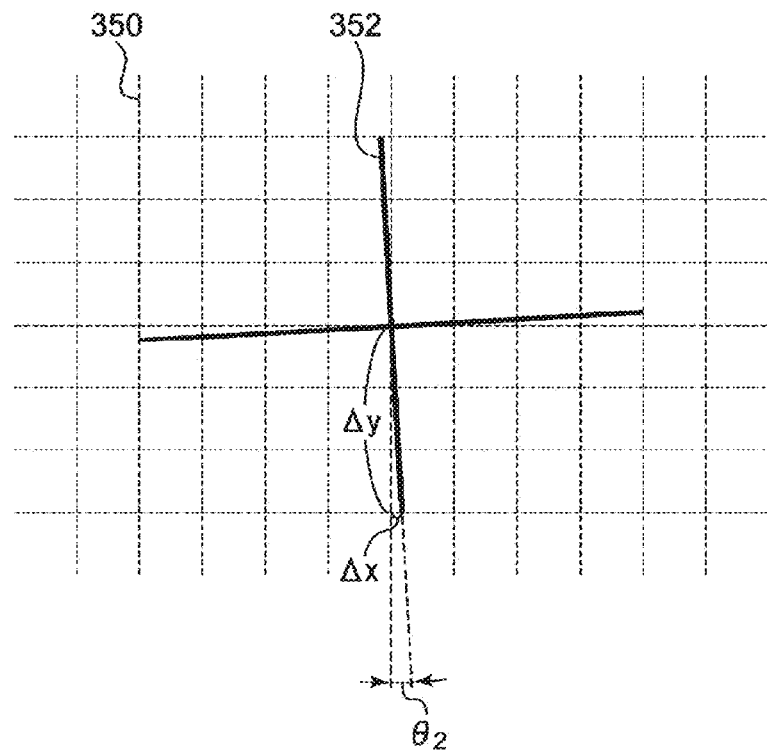
FIG. 7 is a diagram illustrating a state in which a predetermined pattern of the chart is inclined with respect to the direction of a pixel axis on an image.

Next, a deviation angle between a direction of a pixel axis 350 of the camera module 300 and the direction of the pattern 610 of the chart 600 will be described with reference to FIG. 7. FIG. 7 is a diagram illustrating a state in which a predetermined pattern of the chart is inclined with respect to the direction of a pixel axis on an image.

The camera module 300 captures the pattern 610 of the chart 600. When an installation direction of the camera module 300 in the electronic device 150 is inclined, an image (pattern image) 352 of the captured pattern 610 may be inclined with respect to the pixel axis 350. Let this inclination angle be $\theta_2$. $\theta_2$ can be obtained by counting a ratio of the number of pixels $\Delta x$ in the horizontal direction and the number of pixels $\Delta y$ in the vertical direction along the pattern image 352. Further, a pixel density is much higher than a grid illustrated in FIG. 7.

$$\theta_2 = \tan^{-1}(\Delta x / \Delta y)$$

Since FIG. 7 is drawn based on the pixel axis, the pattern image 352 is rotated counterclockwise with respect to the pixel axis 350. When it is considered based on a gravity axis, since the direction of the pattern 610 matches the gravity, the pixel axis 350 is rotated clockwise and inclined.

Assuming that the direction of the pattern 610 of the chart 600 matches the direction of gravity ($\theta_3=0$) as illustrated in FIG. 6A, from the measurement results of FIG. 5A, FIG. 5B and FIG. 7, an inclination $\Delta\theta$ of the coordinate axis 208 of the angular velocity detection part 204 of the gyro sensor with respect to the pixel axis 350 of the camera module 300 is given as follows.

$$\Delta\theta = \theta_1 + \theta_2 \quad \text{Eq.(2)}$$

It is a matter of course that a positive or negative sign of $\theta_1$, $\theta_2$ and the like should be determined in consideration of the direction of inclination or the like.

The inclination $\Delta\theta$ of Eq. (2) may be held as the parameter for correcting the detection signal (angular velocity signal) of the blur detection element 200A (the angular velocity detection part 204) during the actual operation of the electronic device 150.

Figure 8:
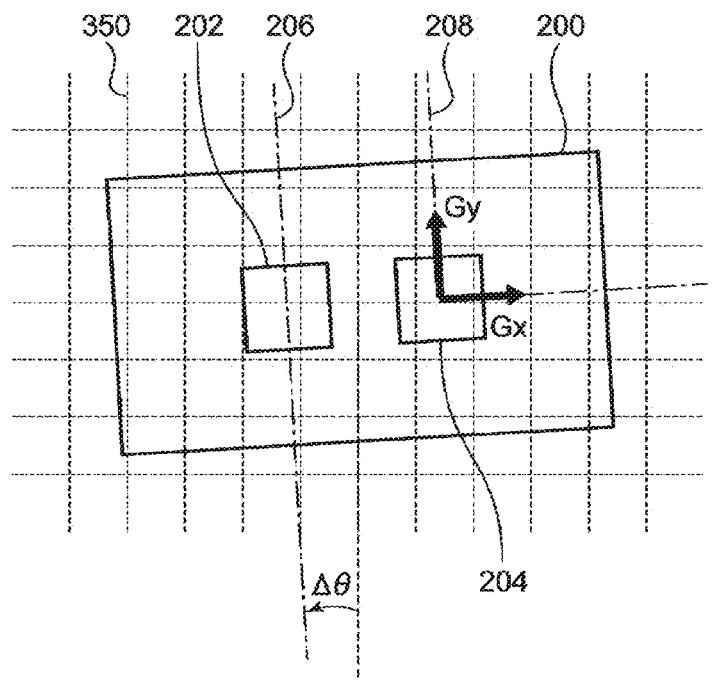
FIG. 8 is a diagram illustrating a relationship of inclination between a pixel and a gyro sensor.

Correction of influence of the inclination $\Delta\theta$ during the actual operation of the electronic device 150 will be described. FIG. 8 is a diagram illustrating a relationship of inclination between the pixels and the gyro sensor 204. As illustrated in FIG. 8, it is assumed that the inclination of the coordinate axis 208 (=the coordinate axis 206 of the acceleration sensor 202) of the gyro sensor 204 with respect to the pixel axis 350 is $\Delta\theta$ and output values of the gyro sensor 204 in the direction of the angular velocity detection axis are $G_x$ and $G_y$. At this time, when $G_x$ and $G_y$ are vector-distributed in the pixel axis direction, values $P_x$ and $P_y$ at that time are obtained as follows.

$$P_x = G_x \cos\Delta\theta - G_y \sin\Delta\theta \quad \text{Eq.(3)}$$

$$P_y = G_x \sin\Delta\theta + G_y \cos\Delta\theta \quad \text{Eq.(4)}$$

In this manner, the components of the angular velocity detection signal acting in the direction of the pixel axis are obtained. Also in this case, it is necessary to determine a positive or negative sign of the inclination $\Delta\theta$ and the output values $G_x$ and $G_y$ according to their directions.

Further, if the operation of trigonometric function as given above is problematic in terms of processing capability of CPU or DSP, it may be calculated by using approximate expressions as follows, under an assumption that $\theta \approx 0$.

$$\cos\theta \approx 1 - \theta^2/2 \quad \text{Eq.(5)}$$

$$\sin\theta \approx \theta \quad \text{Eq.(6)}$$

Figure 9:
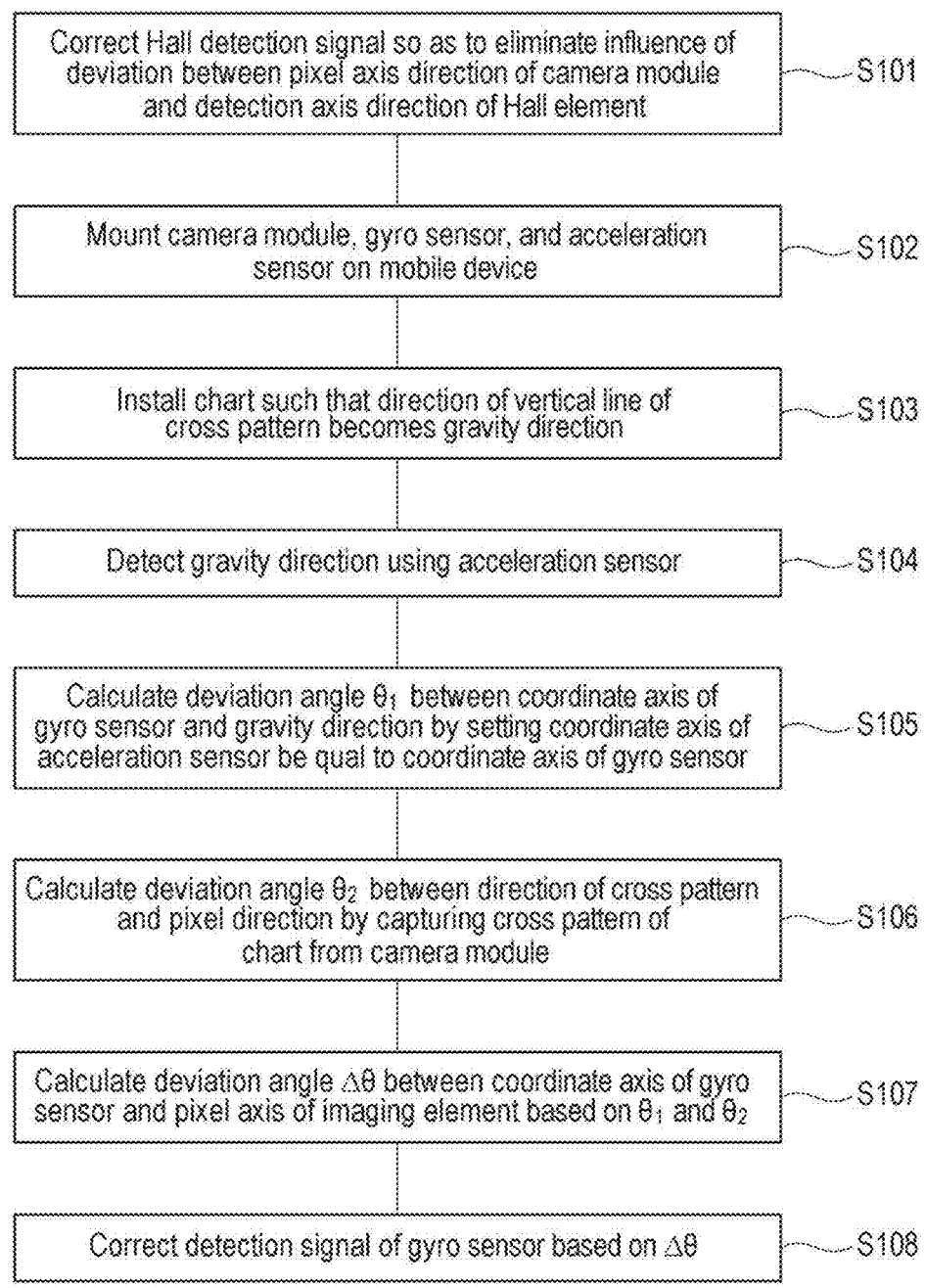
FIG. 9 is a flowchart of calibration according to an embodiment of the present disclosure.

The calibration method of the angular velocity detection signal when the direction of the pixel axis and the direction of the angular velocity detection axis of the gyro sensor are inclined is as described above. FIG. 9 is a flowchart of the calibration according to an embodiment of the present disclosure.

Step S101 is not an essential process, but a Hall detection signal may be corrected in advance so as to eliminate an influence of deviation between a pixel axis direction of the camera module and a detection axis direction of a Hall element (a position detection element). If there is no deviation, there is no need to make the correction, and if the camera module does not have the position detection element such as the Hall element mounted thereon, the calibration may be executed without applying step S101.

In step S102, as illustrated in FIG. 4A and FIG. 4B, the camera module 300 and the gravity and blur detection element 200 including the gyro sensor and the acceleration sensor are mounted on the electronic device 150 such as a smartphone. Here, they are not mounted roughly, but, in some embodiments, they may be mounted so that the deviation angle is suppressed to an extent that at least the approximate expressions of Eq. (5) and Eq. (6) can be used.

In step S103, a chart having a pattern with directionality, such as a cross pattern, is prepared, and an installation angle of the chart is adjusted such that the direction of the pattern (the direction of the vertical line of the cross pattern or the like) matches the direction of gravity. Since such an adjustment is not necessary for each entity and it is an initial adjustment for a production device, the adjustment may be performed with a precision as high as possible even if it takes time in some embodiments. If the direction of the pattern cannot match the direction of gravity by all means, the deviation angle may be measured, and considered and corrected later when the deviation angle between the pixel axis and the direction of gravity is measured.

In step S104, the direction of gravity is detected by using the acceleration sensor in the integrated acceleration sensor and gyro sensor. When the acceleration detection axis and the direction of gravity deviates from each other, since gravity is detected by being distributed to the two axes, the direction of gravity may be determined by using their ratio.

In step S105, a deviation angle $\theta_1$ between the coordinate axis of the gyro sensor and the direction of gravity is calculated based on the direction of gravity measured in step S4 by making the coordinate axis of the acceleration sensor equal to the coordinate axis of the gyro sensor.

In step S106, a cross pattern of the chart is captured by the camera module, and a deviation angle $\theta_2$ between a direction of the cross pattern on the image and an arrangement direction of pixels is calculated.

In step S107, an inclination angle $\Delta\theta$ of the direction of the angular velocity detection axis of the gyro sensor with respect to the direction of the pixel axis of the imaging element is calculated by using $\theta_1$ and $\theta_2$. Thus, it is possible to calculate a deviation angle between the pixel axis of the camera module and the angular velocity detection axis of the gyro sensor by using the direction of the gravity as an intermediary.

In step S108, an angular velocity detection signal of the gyro sensor is corrected based on $\Delta\theta$.

The calibration for the deviation between the pixel axis and the angular velocity detection axis is completed in this manner.

<Imaging Device>

Figure 10:
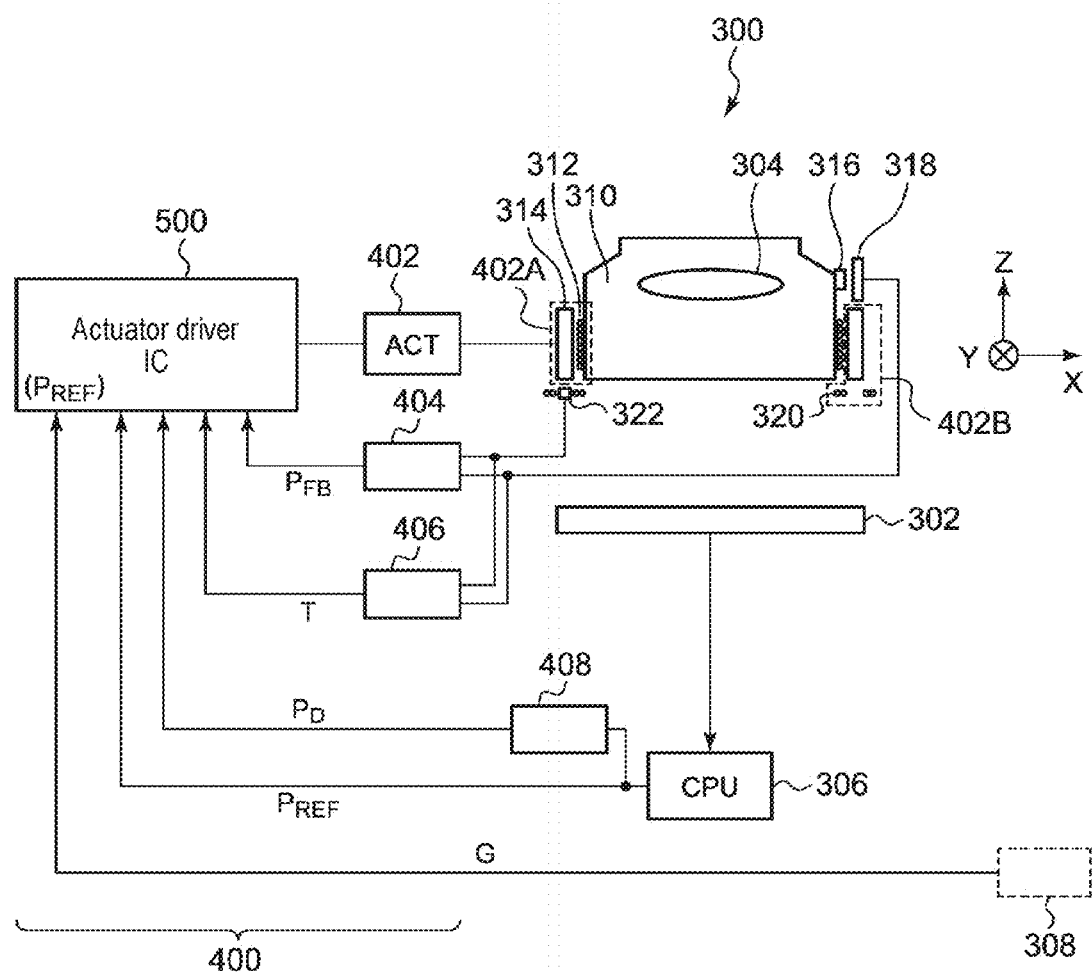
FIG. 10 is a block diagram illustrating a system configuration example of a camera module according to an embodiment of the present disclosure.

Next, the imaging device according to an embodiment of the present disclosure will be described with reference to FIG. 10 to FIG. 12.

First, a configuration example of the camera module that is an example of the imaging device will be described with reference to FIG. 10. FIG. 10 is a block diagram illustrating a system configuration example of the camera module according to an embodiment of the present disclosure.

The camera module 300 includes an imaging element 302, a lens 304, a processor 306, and a lens control device 400. Further, a signal from the gyro sensor 308 is input to the lens control device 400. The gyro sensor 308 is installed outside the camera module. In some embodiments, the signal from the gyro sensor 308 may be calibrated with respect to the pixel axis, based on the processing of Eqs. (3) and (4) described above. The correction based on Eqs. (3) and (4) may be executed inside an actuator driver IC 500 (for example, by a gyro DSP 550 in FIG. 12).

The lens 304 is disposed on the optical axis of light incident on the imaging element 302. The lens control device 400 positions the lens 304 in the optical axis direction based on a position command value (also referred to as a target code) $P_{REF}$ from the processor 306. Further, the lens control device 400 generates the position command value (target code) $P_{REF}$ based on an output (an output corrected according to the angular deviation) G from the gyro sensor 308, and positions the lens 304 based on the position command value PRE.

The lens control device 400 includes an actuator 402 and the actuator driver integrated circuit (IC) 500. The actuator 402 includes an AF actuator part 402A for displacing the lens 304 in the optical axis direction (Z axis direction), and an OIS actuator part 402B for independently displacing the AF actuator part in two directions (X axis direction and Y axis direction) perpendicular to the optical axis. The AF actuator part 402A and the OIS actuator part 402B are incorporated in the camera module 300. In the AF operation, the processor 306 generates the position command value $P_{REF}$ such that the contrast of the image captured by the imaging element 302 becomes high (contrast AF). Alternatively, the position command value $P_{REF}$ may be generated based on the output from the AF sensor installed outside the imaging element 302 and embedded in an imaging surface (phase difference AF). For the OIS, the position command value $P_{REF}$ is generated by inputting the output G from the gyro sensor 308 to the actuator driver IC 500.

The actuator 402 is, for example, a voice coil motor, and the lens 304 is mounted on a holder 310 and supported so as to be movable in the Z axis direction. An AF coil 312 is wound around the holder 310, and an AF permanent magnet 314 is disposed so as to face the AF coil 312. Although not illustrated, an AF yoke may be installed in contact with the AF permanent magnet 314. By supplying electric power to the AF coil 312, the lens 304 and the holder 310 are integrally driven in the Z axis direction by magnetic interaction with the AF permanent magnet 314. A permanent magnet 316 for position detection is fixed to the holder 310, and a Hall element 318 is disposed in a fixing part which faces the permanent magnet 316 and does not move in the AF direction, such that the position in the AF direction can be detected by a relative displacement between the permanent magnet 316 and the Hall element 318.

Moreover, the entire AF actuator part becomes a movable portion and is supported to be movable in the XY direction. An OIS coil 320 and a Hall element 322 are fixed to the fixing part so as to face the AF permanent magnet 314. The AF permanent magnet 314 and the OIS coil 320 form an OIS actuator part 403, and the AF actuator part (OIS movable part) is driven in the XY direction by their magnetic interaction. Further, the position in the OIS direction may be detected by the relative displacement between the AF permanent magnet 314 and the Hall element 322.

In this manner, a position detection element 404 is formed by combination of the permanent magnet and the Hall element. The position detection element 404 generates an electric signal (hereinafter, referred to as a position detection signal $P_{FB}$) corresponding to the current position of the lens 304, and the position detection signal $P_{FB}$ is fed back to the actuator driver IC 500. A temperature detection means 406 for detecting the temperature may be formed by using the Hall elements 318 and 322. The temperature detection means 406 provides a temperature detection signal T to the actuator driver IC. Thus, since an internal temperature of the actuator can be detected, it can be used for temperature correction of the position detection signal or the like.

The actuator driver IC 500 is a functional IC integrated on one semiconductor substrate. The term "integration" as used herein may include a case where all the components of a circuit are formed on a semiconductor substrate or a case where main components of a circuit are integrated, and some resistors, capacitors, or the like may be installed outside the semiconductor substrate in order to adjust circuit constants. By integrating the circuit on one chip, it is possible to reduce a circuit area and to keep characteristics of circuit elements uniform.

The actuator driver IC 500 feedback-controls the OIS actuator part 403 such that the feedbacked position detection signal $P_{FB}$ matches the position command value PRE.

Pixel displacement information such as a distance or a displacement amount in a captured image of a predetermined pattern is obtained based on the information from the processor 306. That is, a pixel displacement detection means 408 provides pixel displacement information PD to the actuator driver IC based on the pixel information.

Figure 11A:
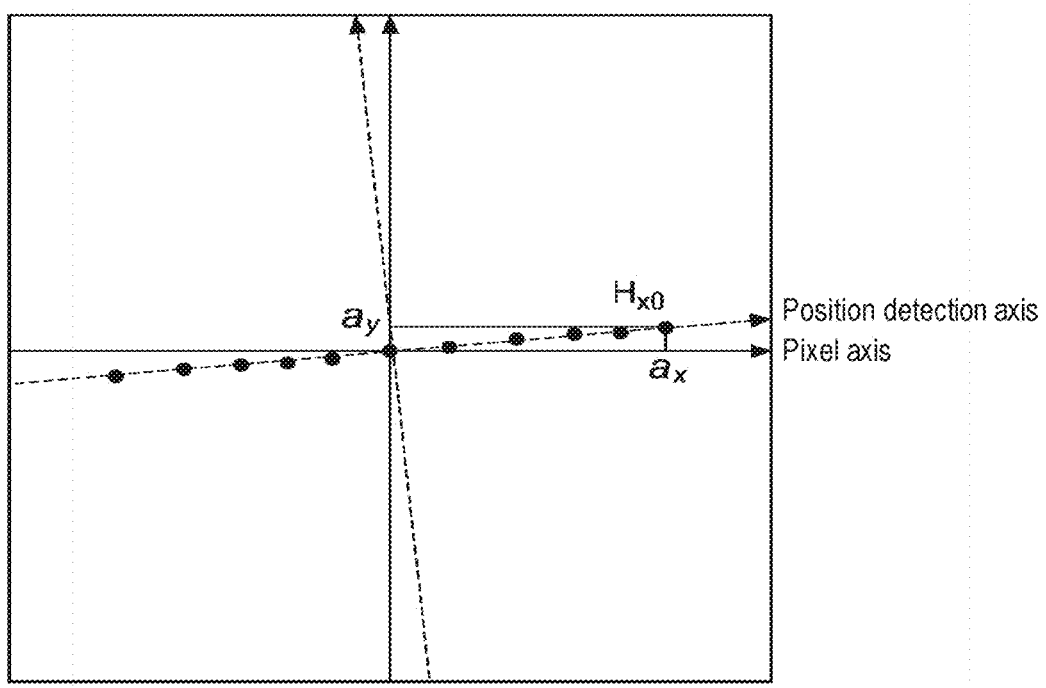
FIG. 11A and FIG. 11B are diagrams illustrating a deviation angle between a pixel axis and a position detection axis of the camera module in the imaging device.
Figure 11B:
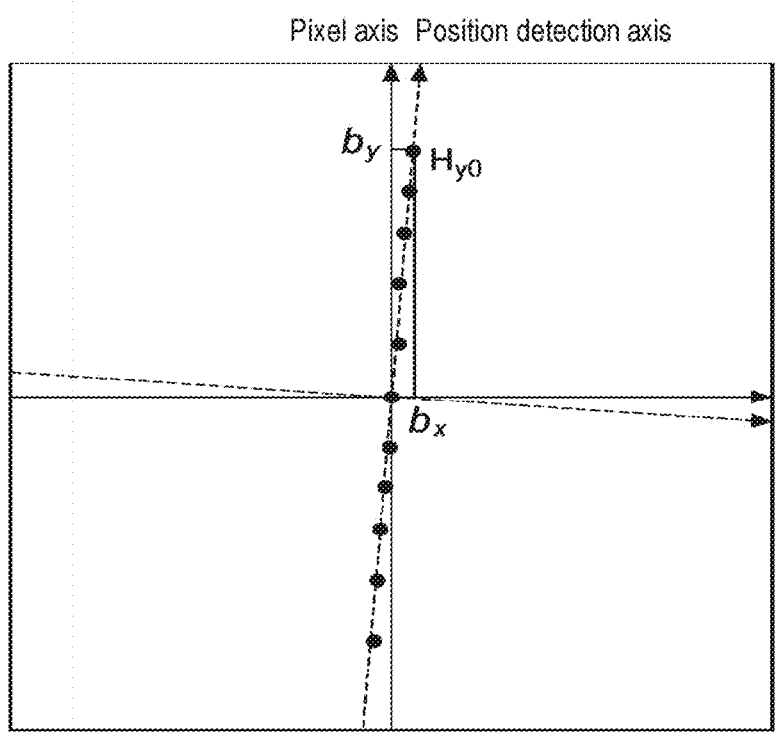

Next, the correction of the inclination of the position detection axis with respect to the pixel axis will be described with reference to FIG. 11A and FIG. 11B. FIG. 11A and FIG. 11B are diagrams illustrating a deviation angle between the pixel axis and the position detection axis of the camera module in the imaging device. When an offset is given to the Hall signal in the x direction while a servo is applied by feeding back the Hall detection signal, the lens is displaced in the direction of the Hall detection axis in the x direction. No offset is given to the Hall signal in the y direction. The result of FIG. 11A can be obtained by observing the movement of the pattern on the pixels at this time. The result of FIG. 11B can also be obtained in the same manner.

If their relationship linearly changes, amounts of movement of the image in the x direction and the y direction at a certain position detection value $H_{x0}$ are represented by $a_x$ and $a_y$, respectively. A ratio of $a_y$ and $a_x$ at this time indicates the inclination between the pixel axis and the position detection axis, and if a proportional constant is $C_x$, it is expressed as follows.

$$a_y = C_x \cdot a_x \qquad \text{Eq.7)}$$

Similarly, as illustrated in FIG. 11B, when the position detection signal of the Hall element in the x direction is driven in a direction where it hardly changes, amounts of movement of the image in the x direction and the y direction at a certain position detection value $H_{y0}$ are represented by $b_x$ and $b_y$ respectively. A ratio of $b_x$ and $b_y$ at this time indicates the inclination between the pixel axis and the position detection axis, and if a proportional constant is $C_y$, it is expressed as follows.

$$b_x = C_y \cdot b_y \quad \text{Eq.(8)}$$

Further, $C_x$ and $C_y$ denote the inclinations inclusive of a sign.

In addition, position detection sensitivities of the respective Hall elements in the x direction and the y direction are represented by $S_x$ and $S_y$ respectively, and the respective ratios are represented by α and β as follows.

$$\alpha = S_y/S_x \quad \text{Eq.(9)}$$

$$\beta = S_x/S_y \quad \text{Eq.(10)}$$

From the above, if the position detection signals detected for the displacements X and Y on the position detection axis are represented by $H_x$ and $H_y$ respectively, and the position detection signals of the Hall element after correction are represented by $H_x'$ and $H_y'$ respectively, they are expressed as follows.

$$H_x' = H_x - S_x \cdot C_y \cdot Y = H_x - \beta \cdot C_y \cdot H_y \quad \text{Eq.(11)}$$

$$H_y' = H_y - S_y \cdot C_x \cdot X = H_y - \alpha \cdot C_x \cdot H_x \quad \text{Eq.(12)}$$

The proportional constants $C_x$ and $C_y$ are actually measured, and the ratios α and β of the position detection sensitivities of the Hall elements on the respective axes are calculated in advance to obtain the position detection signals $H_x'$ and $H_y'$ after the correction.

The actual displacement information is required for obtaining the position detection sensitivities $S_x$ and $S_y$ of the Hall elements, but for this, the information from the pixel displacement detection means 408 may be used. The information from the pixel displacement detection means 408 is not the displacement information of the lens itself, but since the ratio of $S_x$ and $S_y$ is used for calculation as described above, the information from the pixel displacement detection means 408 may be used as the displacement information of the lens.

Next, a specific configuration example of the lens control device 400 will be described with reference to FIG. 12.

Figure 12:
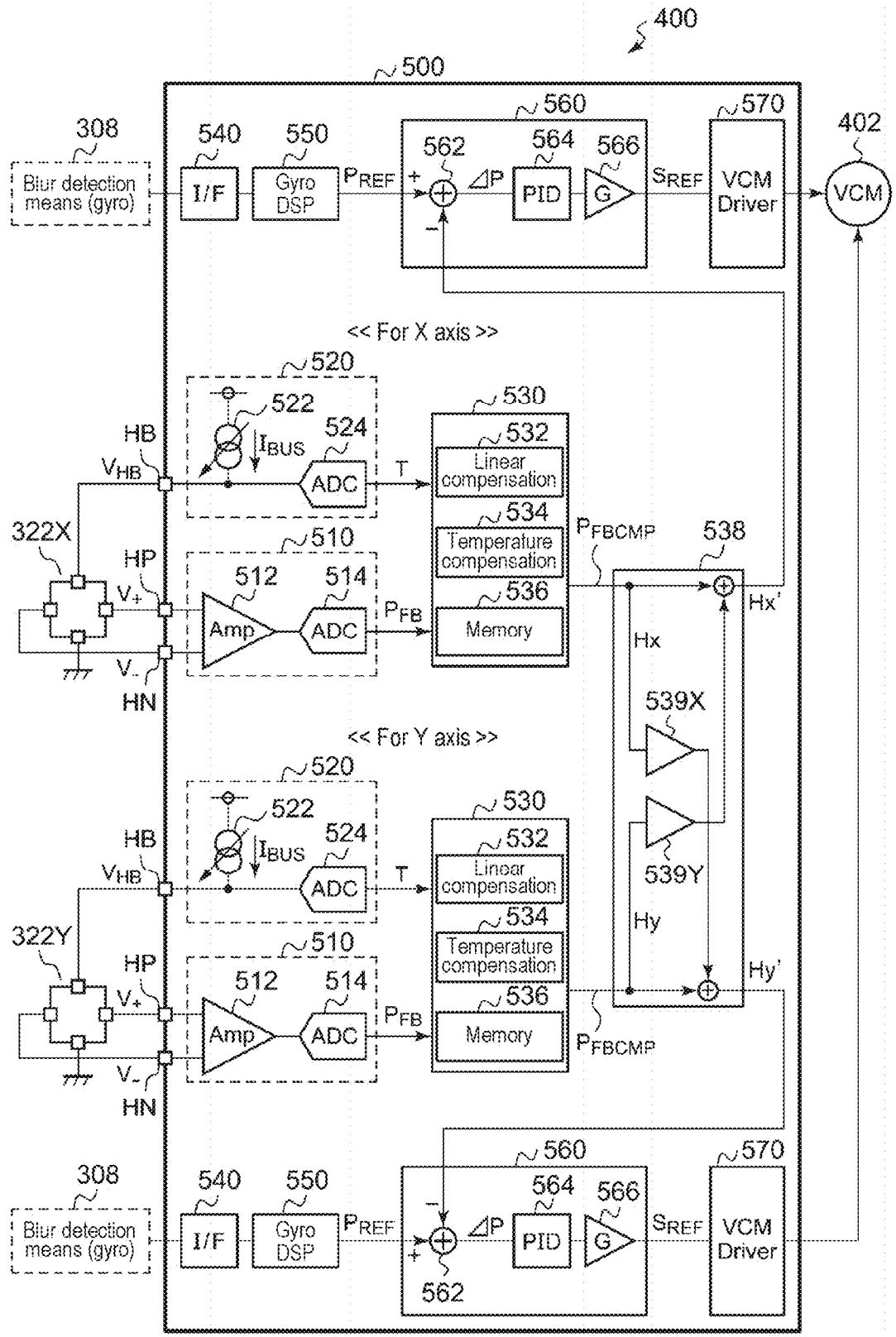
FIG. 12 is a diagram illustrating a configuration of an actuator driver IC according to an embodiment of the present disclosure.

FIG. 12 is a diagram illustrating a configuration of the actuator driver IC according to an embodiment of the present disclosure. In FIG. 12, circuit blocks for the X axis and the Y axis are illustrated, and those for auto focus are omitted. Since they are similarly configured for the X axis and the Y axis, they will be described in common without distinguishing them unless particularly necessary.

The position detection element 404 is Hall elements 322X and 322Y, which generate Hall voltages $V_+$ and $V_-$ according to the displacement of the movable part of the actuator 402 and supply them to Hall detection pins HP and HN of the actuator driver IC 500.

A position detection part 510 generates a digital position detection value $P_{FB}$ indicating a position (displacement) of the movable part of the actuator 402 based on the Hall voltage $V_+$ and $V_-$. The position detection part 510 includes a Hall amplifier 512 for amplifying the Hall voltage and an A/D converter 514 for converting an output of the Hall amplifier 512 into a position detection value $P_{FB}$ having a digital value.

A temperature detection part 520 generates a temperature detection value T indicating a temperature. The Hall elements 322X and 322Y (hereinafter, generally referred to as 322), which serve as the position detection element 404, are also used as the temperature detection element 406. This is based on the fact that an internal resistance r of the Hall element 322 has temperature dependence. The temperature detection part 520 measures the internal resistance r of the Hall element 322 and uses it as information indicating the temperature.

The temperature detection part 520 includes a constant current circuit 522 and an A/D converter 524. The constant current circuit 522 supplies a predetermined bias current $I_{BIAS}$ to the Hall element 322. This bias current $I_{BIAS}$ is a power source signal necessary to operate the Hall element 322, and therefore, the constant current circuit 522 may be recognized as a Hall bias circuit.

A voltage drop ($I_{BIAS} \times r$) occurs between both ends of the Hall element 322. This voltage drop is input to the Hall bias pin HB. The A/D converter 524 converts a voltage $V_{HB}$ ($= I_{BIAS} \times r$) of the HB pin into a digital value T. Since the bias current $I_{BIAS}$ is already known and constant, the digital value T is a signal that is proportional to the internal resistance r, and therefore, includes information on the temperature of the Hall element 322. The relationship between the internal resistance r and the temperature is measured, functionalized or tabled in advance, and the digital value T is converted into the temperature information in a correction part 530 in the subsequent stage.

An interface circuit 540 receives a pitch angular velocity $\omega_P$ and a yaw angular velocity $\omega_Y$ from the gyro sensor which is the blur detection element 308. For example, the interface circuit 540 may be a serial interface such as an inter IC (I²C). A gyro DSP 550 integrates the angular velocity signals $\omega_P$ and $\omega_Y$ received by the interface circuit 540 to generate a position command value $P_{REF}$. In some embodiments, the pitch angular velocity $\omega_P$ and the yaw angular velocity $\omega_Y$ may be values which are vector-distributed and corrected in the direction of the pixel axis. Even the position command value $P_{REF}$ may be generated in the processing circuit that corrects the gyro signal in the direction of the pixel axis.

The correction part 530 corrects the position detection value $P_{FB}$ from the position detection part 510. Specifically, the correction part 530 includes a linear compensation part 532, a temperature compensation part 534, and a memory 536. The temperature compensation part 534 corrects a change in relationship due to a change in temperature, with respect to the relationship between the position detection value $P_{FB}$ and the actual displacement. The linear compensation part 532 corrects the linearity of the relationship between the position detection value $P_{FB}$ and the actual displacement. Various parameters, functions, and the like necessary for correction are stored in the memory 536. The memory 536 may be a nonvolatile memory such as an ROM or a flash memory, or may be a volatile memory that temporarily stores data supplied from an external ROM each time the circuit is activated.

A crosstalk compensation part 538 is represented by two multipliers 539X and 539Y. Each amplifier 539 performs crosstalk compensation by multiplying one Hall detection signal by a predetermined factor inclusive of a sign according to Eqs. (11) and (12) and adding it to the other Hall detection signal.

A controller 560 receives the position command value $P_{REF}$ and the position detection values $H_x'$ and $H_y'$ after the crosstalk correction. The controller 560 generates a control command value $S_{REF}$ such that the position detection values $H_x'$ and $H_y'$ match the position command value $P_{REF}$. When the actuator 402 is a voice coil motor, the control command value $S_{REF}$ is a command value of a drive current to be supplied to the voice coil motor. The controller 560 includes, for example, an error detector 562 and a PID controller 564. The error detector 562 generates a difference (error) $\Delta P$ between the position detection values $H_x'$ and $H_y'$ and the position command value $P_{REF}$. The PID controller 564 generates the control command value $S_{REF}$ by a proportional-integral-derivative (PID) operation. Instead of the PID controller 564, a PI controller may be used, or nonlinear control may be used. A gain circuit 566 for multiplying a predetermined factor may be installed at a subsequent stage of the PID controller 564. A driver part 570 supplies a drive current corresponding to the control command value $S_{REF}$ to the actuator 402.

<Gain Calibration>

The calibration for correcting a deviation between the directions of the coordinate axes has been described above. That is, the calibration method for correcting the deviation angle between the coordinate axis of the blur detection element and the pixel axis in the camera module has been described, and further, the calibration method for correcting the deviation angle between the pixel axis and the position detection axis of the actuator has also been described, by using the direction of the gravity as an intermediary. Thus, the deviation in the direction of the coordinate axis in the case of using different detection means may be corrected (crosstalk-corrected), and further, calibration (gain calibration) for a magnitude of the detection signal of different detection means may be performed in some embodiments. Specifically, it is calibration for obtaining the factors of how much a displacement amount of the lens necessary for correcting the blur angle detected by the blur detection element is and how much the change in the position detection signal at that time is. Of course, the calibration may be performed without excitation.

Figure 13:
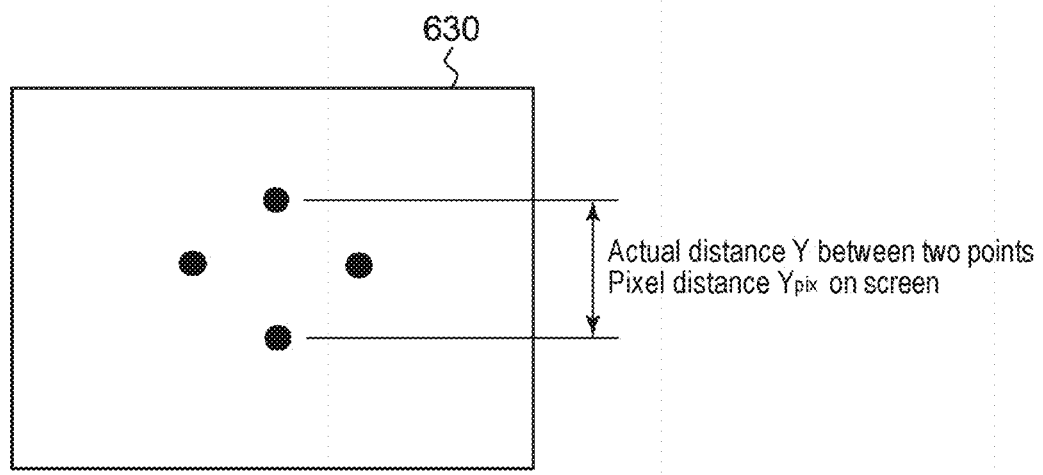
FIG. 13 is a diagram illustrating an example of a pattern of the chart used for gain calibration.
Figure 14:
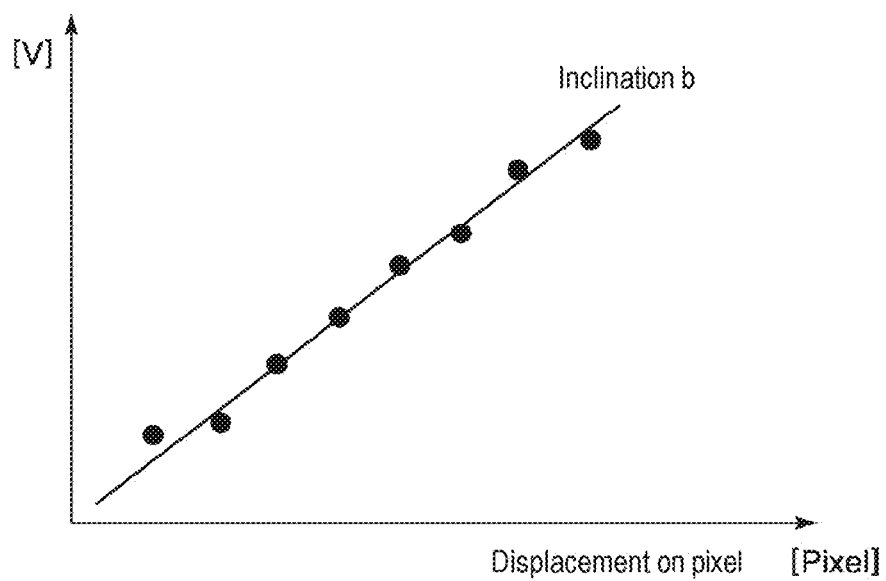
FIG. 14 is a diagram illustrating a relationship between a displacement on a pixel and a Hall signal output used for gain calibration.

A gain calibration of the blur angle and the lens displacement performed without excitation will be described with reference to FIG. 13 and FIG. 14. FIG. 13 is a diagram illustrating an example of a pattern of a chart used for gain calibration. FIG. 14 is a diagram illustrating a relationship between a displacement on pixels and a Hall signal output used for gain calibration.

In the hand blur correction, the lens is shifted according to the blur angle. An optimum lens displacement amount for the blur angle has an entity variation, and a gain calibration for adjusting a relationship between the optimum lens displacement amount and the entity variation is required for each entity. Since the displacement amount of the lens is managed by the position detection signal, in this calibration, a factor indicating a ratio of a change in the position detection signal to an angle change is obtained.

First, a chart 630 having a four-dot pattern as illustrated in FIG. 13 is prepared. Although the cross pattern as described above may be used, the dot pattern is easier to calculate a distance between two points. For example, a distance Y between two upper and lower points on the chart 630 is actually measured in advance. Further, when a focal length L from the camera module to the chart is measured, a viewing angle $\theta$ of the above two points when viewed from the camera module is obtained by the following equation.

$$\theta = \tan^{-1}(Y/L) \qquad \text{Eq.(13)}$$

A unit of $\theta$ is rad of a dimensionless number.

Subsequently, the chart 630 is captured and a distance between two points on the image is obtained as the number of pixels $Y_{pix}$. Therefore, a ratio a of the number of pixels $Y_{pix}$ on the image and the viewing angle $\theta$ may be calculated on the basis of the two points on the chart 630, i.e., as follows.

$$a = Y_{pix}/\theta \qquad \text{Eq.(14)}$$

Next, the lens is displaced by the actuator, and a relationship between the displacement (number of pixels) on the pixel of the dot pattern at that time and the change in the position detection signal is obtained. FIG. 14 shows the results, and its inclination b [V/pixel] is obtained by linearly approximating each measurement point.

Using the above relationship, a change y [V] in an optimum position detection signal for an arbitrary blur angle x [rad] may be obtained by the following equation.

$$y = a \cdot b \cdot x \qquad \text{Eq.(15)}$$

This shows the relationship between the blur angle and the displacement (position detection signal) of the lens.

No vibration is applied when obtaining the above relationship. In other words, since the gain calibration can be executed without an application of vibration, it is unnecessary to apply the vibration during a manufacturing process, and even in a configuration in which the gyro sensor is not included in the camera module, the gain calibration becomes possible with the camera module alone. Moreover, a relationship between a gyro detection signal and the blur angle includes an entity variation of the gyro sensor. However, since an accurate value of the entity variation may not be obtained unless vibration is applied, a standard actual value may be used under a condition that no vibration is applied. Generally, an actual value of a variation in sensitivity of the gyro sensor is sufficiently small as compared with a specification value of the variation. One example of the gain calibration has been described above.

The imaging device as described above is used for electronic devices such as smartphones. In particular, one of applications of the imaging device of the present disclosure may be an imaging device having an optical image stabilization (OIS) function, which is effective particularly in a configuration in which a gyro sensor is not disposed in a camera module. Using the present disclosure, the blur detection signal may be calibrated without an application of vibration, and the calibration is performed individually by preparing common criteria in the camera module and the blur detection element. Thus, it is possible to realize an imaging device capable of performing the calibration even in an unintegrated state and capable of high-precision hand blur correction.

According to the present disclosure in some embodiments, it is possible to calibrate a blur detection signal without an application of vibration. Further, it is possible to provide an imaging device capable of high-precision hand blur correction.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A calibration method for an imaging device including a camera module including an imaging element and a lens installed on a path of light incident on the imaging element; a blur detection element configured to detect an amount of blur acting on the imaging device; and a gravity detection element configured to determine a direction of gravity acting on the imaging device, the calibration method comprising:
- detecting a first angle corresponding to a deviation of a direction of a coordinate axis of the blur detection element with respect to the direction of gravity;
- detecting a second angle corresponding to a deviation of a direction of the camera module with respect to the direction of gravity; and
- acquiring a parameter for correcting a detection signal of the blur detection element based on the first angle and the second angle,
- wherein the act of detecting the second angle includes:
  - capturing a chart having a predetermined pattern with the imaging element; and
  - acquiring the second angle based on a deviation between a direction of the predetermined pattern and a direction of a pixel axis in a captured image,
- wherein the act of detecting the second angle further includes detecting a third angle corresponding to a deviation between the direction of the predetermined pattern of the chart and the direction of gravity in advance, and
- wherein the third angle is used for detecting the second angle.

2. The method of claim 1, wherein the act of detecting the second angle further includes adjusting the direction of the predetermined pattern of the chart in advance according to the direction of gravity.

3. A calibration method for an imaging device including a camera module including an imaging element and a lens installed on a path of light incident on the imaging element; a blur detection element configured to detect an amount of blur acting on the imaging device; and a gravity detection element configured to determine a direction of gravity acting on the imaging device, the calibration method comprising:
- detecting a first angle corresponding to a deviation of a direction of a coordinate axis of the blur detection element with respect to the direction of gravity;
- detecting a second angle corresponding to a deviation of a direction of the camera module with respect to the direction of gravity; and
- acquiring a parameter for correcting a detection signal of the blur detection element based on the first angle and the second angle,
- wherein the act of detecting the first angle includes detecting a fourth angle corresponding to a deviation between a direction of a coordinate axis of the gravity detection element and the direction of gravity, and
- wherein the direction of the coordinate axis of the blur detection element and the direction of the coordinate axis of the gravity detection element are set to be parallel to each other, and the fourth angle is set as the first angle.

4. The method of claim 3, further comprising performing a gain calibration,
- wherein the gain calibration includes:
  - capturing a chart having a predetermined pattern including two points whose length or distance is known;
  - acquiring a viewing angle at which the two points are viewed from the camera module;
  - acquiring a distance between the two points on a captured image as the number of pixels; and
  - displacing the lens and acquiring a change in a position detection signal corresponding to a current position of the lens and a displacement on the pixels of the pattern in units of the number of pixels.

5. An imaging device, comprising:
- a camera module including an imaging element and a lens installed on a path of light incident on the imaging element;
- a blur detection element configured to detect an amount of blur acting on the imaging device;
- a gravity detection element configured to determine a direction of gravity acting on the imaging device,
- an actuator configured to displace the lens in a direction perpendicular to an optical axis; and
- a position detection element configured to detect a displacement of the lens in the direction perpendicular to the optical axis,
- wherein a position detection signal of the position detection element is corrected so as to eliminate an influence of a deviation in a detection direction of the position detection element with respect to a direction of a pixel axis of the imaging element, and
- wherein calibration is performed by:
  - detecting a first angle corresponding to a deviation of a direction of a coordinate axis of the blur detection element with respect to the direction of gravity;
  - detecting a second angle corresponding to a deviation of a direction of the camera module with respect to the direction of gravity; and
  - acquiring a parameter for correcting a detection signal of the blur detection element based on the first angle and the second angle.

6. The device of claim 5, wherein the blur detection element and the gravity detection element are integrally packaged.

7. The device of claim 6, wherein a blur detection part of the blur detection element and a gravity direction detection part of the gravity detection element are fabricated by the same process.

8. The device of claim 5, wherein the gravity detection element is an acceleration sensor configured to detect accelerations in at least two axial directions.

* * * * *